UNITED STATES PATENT OFFICE 2,257,176

VITAMIN D₂ DOUBLE COMPOUNDS

Otto Linsert, Wuppertal-Elberfeld, Germany, assignor to Winthrop Chemical Company, Inc., New York, N. Y., a corporation of New York No Drawing. Application June 22, 1939, Serial No. 280,582. In Germany November 22, 1938

3 Claims. (Cl. 260—397.2)

This invention relates to vitamin D₂ double compounds. As it is known ergosterol is converted into an antirachitically highly active transformation product by chemically active irradiation, particularly by ultraviolet irradiation. The transformation product which has been prepared in pure form and which has been detected in natural vitamin D containing materials has been called vitamin D₂.

The vitamin D₂, immaterial whether produced from natural sources or by irradiation of ergosterol, shows the disadvantage that it is sensitive to oxygen. On storage without special precautions the vitamin D₂ in pure form as well as in preparations, for instance solutions or mixtures with inert ingredients, is changed and therefore the antirachitic efficacy is gradually decreased.

In accordance with the present invention it has been found that the vitamin D₂ forms double compounds with sterols of the group consisting of cholesterol, cholestanol, coprosterol, sitostanol, and stigmastanol and that the sensitiveness of vitamin D₂ in the double compounds is considerably decreased, the vitamin D efficacy is preserved and corresponds to the vitamin D₂ content. The greater stability of the double compounds allows a more convenient handling of vitamin D₂, so that a storage or use without special precautions is possible.

The manufacture of the double compounds may be performed as follows:

The components are dissolved in a suited solvent, for instance acetone, if necessary by heating, and then water is added to the solution in such an amount that the greatest part of the sterol is precipitated in amorphous form. The precipitate thus obtained is converted after a short time into the crystallized double compound.

The new vitamin D₂ sterol double compounds are stable and may be recrystallized unchanged from suited solvents. Their less sensitiveness against oxygen allows a more convenient handling of vitamin D₂. The vitamin efficacy is not diminished and corresponds to the vitamin D₂ content.

The following example illustrates the invention without, however, restricting it thereto.

Example 1 g. of vitamin D₂ and cholestanol are dissolved in 70 cc. of hot acetone and thereto 30 cc. of water are added. The precipitate of at first not pronounced crystalline appearance is changed after some hours into a mass of needles fine as a hair, which is filtered with suction on standing for one day, washed with a 70 percent aqueous acetone and dried in vacuo. Yield: 90–95 percent, melting point 104–106°, specific rotary power $[\alpha]_D = +54°$ in acetone.

A corresponding double compound is obtained by using instead of cholestanol the equivalent quantity of sitostanol. The double compound thus formed has a melting point of 116° and a specific rotary power $[\alpha]_D = +54°$ in acetone.

I claim:

1. Double compounds of vitamin D₂ with a sterol selected from the group consisting of cholesterol, cholestanol, coprosterol, sitostanol, and stigmastanol.

2. The double compound of vitamin D₂ with cholestanol representing thin needles melting at 104–106° and showing the specific rotary power $[\alpha]_D = +54°$ in acetone.

3. The double compound of vitamin D₂ with sitostanol melting at 116° and showing the specific rotary power $[\alpha]_D = +54°$ in acetone.

OTTO LINSERT.